United States Patent Office 3,007,933
Patented Nov. 7, 1961

3,007,933
PROCESS FOR THE PREPARATION OF SECONDARY AND TERTIARY ACETYLENIC AMINES
George F. Hennion, South Bend, Ind., assignor to Eli Lilly and Company, Indianapolis, Ind., a corporation of Indiana
No Drawing. Filed Feb. 27, 1957, Ser. No. 642,645
6 Claims. (Cl. 260—293)

This invention relates to a process for preparing secondary and tertiary acetylenic amines.

Secondary and tertiary acetylenic amines, for example, 3-diethylamino-1-propyne and 3-dimethylamino-3-methyl-1-butyne, have been described, but no general method for preparing these compounds has been known. The methods now available for their preparation are of limited application and are both cumbersome and tedious.

By this invention is provided a process of preparing a compound having the following formula:

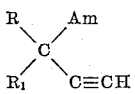

in which Am represents an amino radical derived from an amine of the group consisting of primary and secondary lower alkylamines and monoaryl-lower alkylamines, and piperidine, pyrrolidine and morpholine, and R and $R_1$ represent members of the group consisting of hydrogen and lower alkyl radicals, at least one of R and $R_1$ being a lower alkyl radical having a hydrogen attached to that carbon atom bound to the carbon atom adjacent to the acetylenic grouping, and R and $R_1$ taken together represent a cycloalkyl radical.

The process of this invention is carried out by reacting an amine of the character described above, with an acetylenic halide having the following formula:

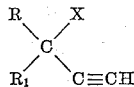

wherein X is chlorine or bromine, and R and $R_1$ have the same significance as above. The reaction between the halogen compound and the amine is effected by reacting the two compounds in an aqueous dispersion such as a solution or emulsion, the reaction temperature being from about 20° C. to about 100° C., and the time of reaction being from about one to three days.

The reaction time and temperature selected depend in large part upon the structure of the reactants. Thus, for example, tertiary acetylenic halides, such as methylethylethynylcarbinyl chloride require shorter reaction times and relatively lower temperatures of reaction than do the secondary acetylenic halides, such as n-propylethynylcarbinyl chloride. Likewise, as is well known, some amines are more reactive than others because of differences in base strength and steric hindrance.

A stoichiometric excess of the reacting amine customarily is employed, the excess of the amine providing the base needed for reacting with and neutralizing the halogen acid split out during the course of the reaction. However, if the amine used is particularly scarce or if its recovery from its hydrogen halide salt as formed during the reaction is impractical, a basic tertiary amine such as pyridine or tributylamine can be used in the reaction mixture for neutralization of the acid.

The acetylenic amine produced as a reaction product is isolated from the reaction mixture by conventional methods. Frequently, it spontaneously crystallizes out of the reaction mixture when the mixture is allowed to stand in the cold and therefore can be recovered by centrifugation or filtration. In the event the acetylenic amine does not crystallize out, it can readily be recovered from the reaction mixture by extraction with a suitable water-immiscible solvent, for example, ether or benzene.

As is apparent from the above-defined group of acetylenic halides, the halide employed in this invention is one which is capable of splitting out the elements of a hydrogen halide; that is, it contains the hydrogen and halogen elements bound on adjacent carbon atoms. Those acetylenic halides which are so constituted that they are incapable of splitting out or eliminating the elements of a hydrogen halide are not included within the scope of this invention.

As is well known in the art, secondary and tertiary alkyl halides readily split out a halogen acid upon treatment with base to yield one or more ethylenic hydrocarbons as the chief reaction products. In fact, the reaction between a base and an alkyl halide capable of splitting out a halogen acid is a common preparative method for ethylenic hydrocarbons. Thus, although the process provided by this invention entails a similar type of reaction between a base and an alkyl halide capable of losing the elements of a hydrogen halide, the expected elimination product is not produced, but surprisingly the process produces the unexpected substitution product in which the halogen is replaced by a primary or secondary amino group. It is also surprising that this reaction can be carried out in an aqueous medium since hydrolysis of the acetylenic halide would be an expected side reaction.

Many acetylenic halides can be employed in my novel process provided they conform to the structural requirements set forth hereinabove. In the formula, R and $R_1$, when taken separately, can be a hydrogen atom, a methyl radical, an ethyl radical, a butyl radical, an isobutyl radical, a sec-butyl radical, an n-amyl radical, a hexyl radical, an isooctyl radical and the like, and when taken together with the carbon atoms to which they are attached, R and $R_1$ can form a cyclopentyl radical, a cyclohexyl radical, a cycloheptyl radical, a methylcyclohexyl radical, an ethylcyclopentyl radical and the like. Halides illustrative of those which can be employed in the process of this invention include the following: 3-chloro-3-methyl-1-butyne, 3-bromo-3-methyl-1-butyne, 3-chloro-3-methyl-1-pentyne, 3-chloro-1-hexyne, 3-bromo-3-methyl-1-hexyne, 3-chloro-3-methyl-1-octyne, 3-chloro-1-nonyne, 1-chloro-1-ethynylcyclohexane, 1-chloro-1-ethynylcyclopentane, 1-chloro - 1 - ethynylcycloheptane, 1 - chloro-1-ethynyl-4-methylcyclohexane. Among the secondary and tertiary amines corresponding to the formula AmH which can be employed in my novel process are methyl amine, dimethyl amine, ethyl amine, diethyl amine, methylethyl amine, di-n-propyl amine, di-n-butyl amine, n-propyl amine, isobutyl amine, hexyl amine, di-n-octyl amine, isopropyl amine, benzyl amine, benzylmethyl amine, phenylethyl amine, dibenzyl amine and the like.

The reaction of an acetylenic halide and a secondary or tertiary amine having the above specified structural characteristics illustratively yields the following compounds: 3-diethylamino - 1 - butyne, 3-dimethylamino-3-methyl-1-butyne, 1 - ethynyl-1-methylaminocyclohexane, 3-piperidino-1-hexyne, 3-pyrrolidino-3-ethyl-1-pentyne, 3-morpholino-1-octyne, 1-ethynyl - 1 - isobutylamino-cyclopentane, 3-dibenzylamino-1-methyl-1-butyne, 3-benzylmethylamino - 3 - ethyl-1-nonyne, 3-phenethylamino-1-decyne and 1-pyrrolidino-1-ethynylcyclohexane.

In carrying out my novel process an aqueous solvent is customarily employed. However, if either the amine or acetylenic halide does not have a substantial solubility in water or if a homogeneous reaction mixture is desired, a second solvent which is inert to the reactants can be employed along with water. Illustrative of such an inert solvent are acetone, ethanol and the like. The reaction is customarily carried out in a loosely stoppered reaction flask or, if reflux is to be used, with a flask equipped with a reflux condenser. When a volatile amine such as methyl amine is used, however, it is necessary to employ a pressure bottle or the like as a reaction flask in order to prevent escape of the volatile amine.

The secondary and tertiary acetylenic amines produced in the above reaction are useful intermediates in the synthesis of pharmacologically active compounds. For example, 3-dimethylaminobutyne-1 can be reacted with α,α'-dithienyl ketone to yield 1,1-(α,α'-dithienyl)-4-dimethylamino-2-pentynol. This compound and the compound produced by fully hydrogenating the acetylenic triple bond are spasmolytics. Furthermore, acetylenic amines as provided by the invention are useful chemical compounds in that they can be converted to other useful intermediates. For example, the acetylenic bond can be partially or totally reduced or it can be hydrated to give a substituted methyl ketone which can then be reduced to an alcohol or it can be semi-hydrogenated and then hydrated to give an amino substituted ethanol directly. For example, 3-dimethylaminobutanol-2 can be prepared from 3-dimethylaminobutyne-1 either by hydration and reduction of the thus formed ketone, or by semi-hydrogenation to an ethylenic compound followed by hydration to the secondary alcohol. 3-dimethylaminobutanol-2 when reacted with benzoyl chloride yields the corresponding benzoate which has local anesthetic properties.

This invention is further illustrated by the following specific examples:

EXAMPLE 1

*Preparation of 3-dimethylamino-3-methyl-1-butyne*

Twenty-five grams of dimethylethynylcarbinyl chloride, 70 ml. of 40% aqueous dimethylamine solution and 50 ml. of acetone are placed in a 250 ml. flask which is kept at ambient temperature for about 48 hours. At the end of this time, a solid material comprising 3-dimethylamino-3-methyl-1-butyne is formed by the reaction and precipitates. The solid material is collected by filtration and is washed with water. The filter cake is dissolved in about 200 ml. of anhydrous ether and the resulting solution is dried over potassium hydroxide pellets. The dried solution is separated from the drying agent by filtration. Seventy milliliters of a 3.2 N solution of hydrogen chloride in ether is added to the dried solution containing the 3-dimethylamino-3-methyl-1-butyne to form the corresponding hydrochloride salt. This salt, being insoluble in ether, precipitates immediately, and is collected by filtration. Recrystallization of the filter cake from an ethyl acetate-ethanol solvent mixture yields 23 g. of 3-dimethylamino-3-methyl-1-butyne hydrochloride melting with decomposition at about 241–242° C.

*Analysis.*—Calculated: N, 9.49. Found: N, 9.69.

EXAMPLE 2

*Preparation of 3-pyrrolidino-3-methyl-1-butyne*

A reaction is carried out according to the procedure of Example 1 except that 60 ml. of pyrrolidine and 20 ml. of water are employed in place of the aqueous dimethylamine and acetone of Example 1. 3-pyrrolidino-3-methyl-1-butyne melts at about 76–78° C. after recrystallization from a water-ethanol solvent mixture. 3-pyrrolidino-3-methyl-1-butyne hydrochloride prepared from the free base by the method of Example 1 melts at about 232–233° C.

*Analysis.*—Calculated: C, 62.23; H, 9.29; N, 8.07. Found: C, 62.40; H, 9.57; N, 8.30.

3-morpholino-3-methyl-1-butyne is prepared by substituting morpholine for piperidine in the above example.

EXAMPLE 3

*Preparation of 1-pyrrolidino-1-ethynylcyclohexane*

Ten grams of 1-ethynylcyclohexyl chloride, 60 ml. of pyrrolidine and 20 ml. of water are mixed to produce 1-pyrrolidino-1-ethynyl cyclohexane. The compound melts at about 65–66.5° C. after recrystallization from aqueous ethanol.

*Analysis.*—Calculated: N, 7.90. Found: N, 8.02.

1-pyrrolidino-1-ethynylcyclohexane hydrochloride prepared by the method of Example 1 from the above free base melts at about 235–236° C.

*Analysis.*—Calculated: N, 6.55. Found: N, 6.78.

EXAMPLE 4

*Preparation of 1-piperidino-1-ethynylcyclohexane*

Following the procedure of Example 1, 1-ethynylcyclohexyl chloride and piperidine are reacted in the presence of water to form 1-piperidino-1-ethynylcyclohexane which melts at about 94.5–95.5° C. after recrystallization from aqueous acetone. 1-piperidino-1-ethynylcyclohexane hydrochloride is prepared therefrom by the method of Example 1 and melts at about 239–240° C.

*Analysis.*—Calculated: N, 6.15. Found: N, 5.87.

EXAMPLE 5

*Preparation of 1-dimethylamino-1-ethynylcyclohexane*

Following the procedure of Example 1, 1-ethynylcyclohexyl chloride and dimethylamine are reacted together in the presence of water and acetone. After remaining at room temperature for about 24 hours, the volatile solvents are removed from the reaction mixture by distillation in vacuo. A two phase residue remains in the flask, one phase of which solidifies upon cooling to about −10° C. The resulting solid material which comprises 1-dimethylamino-1-ethynylcyclohexane melts at about 57–58° C. after recrystallization from aqueous alcohol. The corresponding hydrochloride which is prepared from the free base by the method of Example 1, melts at about 222–223° C.

*Analysis.*—Calculated: C, 63.98; H, 9.67; N, 7.46. Found: C, 63.88; H, 9.73; N, 7.46.

EXAMPLE 6

*Preparation of 3-ethylamino-3-methyl-1-pentyne*

Forty grams of methylethylethynylcarbinyl chloride and 150 ml. of 70% aqueous ethyl amine are placed in a stoppered bottle and allowed to stand at ambient room temperature for about 12 hours, during which time the reaction mixture separates into two layers. The reaction flask is then shaken for an additional 30 hours. The upper layer containing the 3-ethylamino-3-methyl-1-pentyne formed in the reaction is separated. The lower layer is shaken with an equal volume of water and is allowed to stand. The resulting upper layer which separates is recovered and is added to the first-recovered upper layer. The combined layers containing the 3-ethylamino-3-methyl-1-pentyne are diluted with about 100 ml. of ether and the ethereal solution is washed twice with water, and is dried over potassium hydroxide. The drying agent is removed by filtration, and the filtrate is distilled in vacuo. 3-ethylamino-3-methyl-1-pentyne boils at about 70–79° C. at a pressure of 120 mm. of mercury. Redistillation of this fraction at the same pressure yields 3-ethylamino-3-methyl-1-pentyne boiling at about 74–79° C.

Refractive index: $n_D^{25}$=1.431.

EXAMPLE 7

*Preparation of 3-pyrrolidino-1-hexyne*

Following the procedure of Example 1, n-propylethynylcarbinyl chloride and pyrrolidine are reacted in aqueous solution by heating to about 95° C. for about 18 hours. At the end of this reaction period two layers are present in the reaction flask. The upper layer contains the 3-pyrrolidino-1-hexyne produced in the reaction. This compound is isolated by the procedure of Example 6. 3-pyrrolidino-1-hexyne thus purified boiled at about 71–72° C. at a pressure of about 12 mm. of mercury.

*Analysis.*—Calculated: N, 9.26. Found: N, 937.
Refractive index: $n_D^{25}=1.460$.

3-pyrrolidine-1-hexyne hydrochloride was prepared by the method of Example 1 from the corresponding free base and ethereal hydrogen chloride. It melted at about 176–177° C.

*Analysis.*—Calculated: N, 9.26. Found: N, 9.37.

3-dimethylamino-1-butyne is prepared by the same reaction using dimethylamine in place of pyrrolidine and methylethynylcarbinyl chloride in place of n-propylethynylcarbinyl chloride.

EXAMPLE 8

*Preparation of 3-n-butylamino-1-hexyne*

Following the procedure of Example 1, n-propylethynylcarbinyl chloride and n-butylamine are reacted to form a 3-n-butylamino-1-hexyne by heating at about 65° C. for five days in aqueous solution. 3-n-butylamino-1-hexyne thus produced is isolated by the procedure of Example 6 and upon distillation boils at about 68–72° C. at a pressure of about 11 mm. of mercury. Redistillation of this material at the same reduced pressure yields purified 3-n-butylamino-1-hexyne boiling at about 71–72° C.

*Analysis.*—Calculated: N, 9.14. Found: N, 9.35.
Refractive index: $n_D^{25}=1.436$.

The hydrochloride of this amine was prepared by the method of Eyample 1. It melted at about 166° C.

*Analysis.*—Calculated: N, 7.38. Found: N, 7.21.

3-benzylamino-1-hexyne is prepared by substituting benzylamine for butylamine in the above example.

I claim:

1. The process of preparing a compound of the following formula:

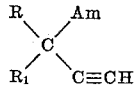

wherein Am represents a member of the group consisting of —NH-lower alkyl, —N(lower alkyl)$_2$, —NH-lower phenylalkyl, —N(lower phenalkyl)$_2$,

and R and R$_1$ taken singly are members of the group consisting of hydrogen and lower alkyl radicals having a hydrogen atom on a carbon atom alpha to the carbon atom carrying the amino grouping, at least one of R and R$_1$ being a lower alkyl radical having a hydrogen atom on a carbon atom alpha to the carbon atom carrying the amino grouping, and R and R$_1$, when taken together with the carbon atom to which they are attached, represent a cycloalkyl radical having from 5 to 7 carbon atoms, which process comprises bringing together within a temperature range of about 20–100° C. and in the presence of water an amine of the formula Am—H wherein Am has the same significance as above, and an acetylenic halide of the formula:

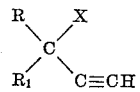

wherein X is chosen from the group consisting of chlorine and bromine and R and R$_1$ have the same significance as above.

2. The process according to claim 1 in which 3-dimethylamino-3-methyl-1-butyne is produced by reacting dimethylethynylcarbinyl chloride with dimethylamine.

3. The process according to claim 1 in which 1-piperidino-1-ethynylcyclohexane is produced by reacting 1-ethynylcyclohexyl chloride and piperidine.

4. The process according to claim 1 in which 3-pyrrolidine-1-hexyne is produced by reacting n-propylethynylcarbinyl chloride and pyrrolidine.

5. The process according to claim 1 in which 3-n-butylamino-1-hexyne is produced by reacting n-propylethynylcarbinyl chloride and n-butylamine.

6. The process according to claim 1 in which 3-ethylamino-3-methyl-1-pentyne is produced by reacting methylethylethynylcarbinyl chloride and ethyl amine.

References Cited in the file of this patent

UNITED STATES PATENTS

| | | |
|---|---|---|
| 2,706,195 | Niederhauser | Apr. 12, 1955 |
| 2,766,285 | Hennion | Oct. 9, 1956 |
| 2,830,048 | Biel | Apr. 8, 1958 |
| 2,830,049 | Biel | Apr. 8, 1958 |

OTHER REFERENCES

Karrer: Organic Chemistry, 2nd Edition, page 122 (1946).